July 2, 1957  H. H. FITE  2,797,544
DEBRIS LIFTING SELF-CLEANING RAKE
Filed Feb. 2, 1955
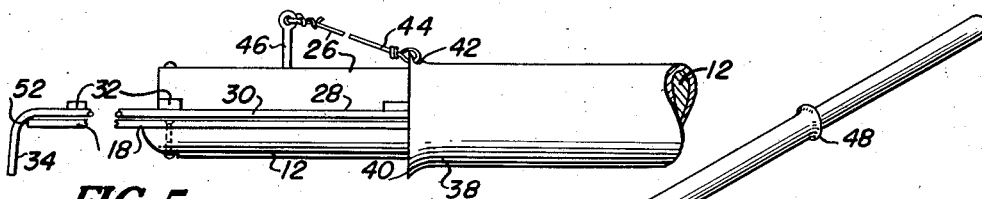
FIG. 5.
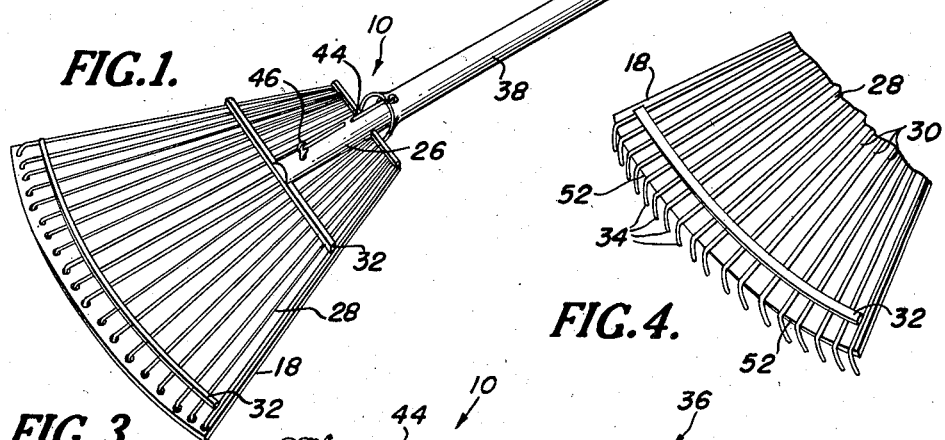
FIG. 1.
FIG. 4.
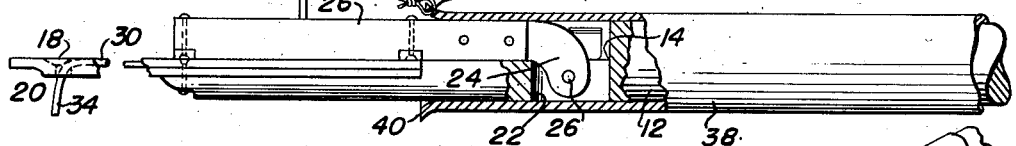
FIG. 3.
FIG. 2.
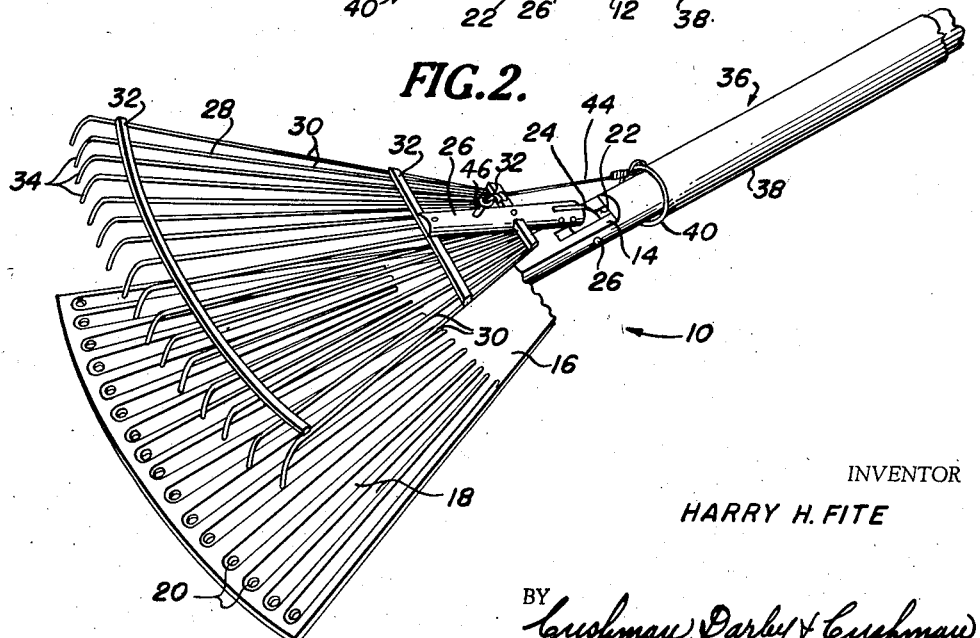
INVENTOR
HARRY H. FITE
BY *Cushman, Darby & Cushman*
ATTORNEYS

United States Patent Office 2,797,544
Patented July 2, 1957

2,797,544

DEBRIS LIFTING SELF-CLEANING RAKE

Harry H. Fite, Washington, D. C.

Application February 2, 1955, Serial No. 485,740

8 Claims. (Cl. 56—400.1)

This invention relates to rakes and more particularly to a rake having cooperative means to facilitate the transportation of debris collected thereby.

It is an object of the present invention to provide a combined raking device capable of functioning both as a conventional garden rake and as a material or debris receiving shovel; the device further cooperates to provide means for positively retaining the raked debris shoveled up from falling or spilling therefrom during its transportation from one place to another.

Another object of the present invention is the provision of a combined raking device which may be utilized as a light snow shovel.

A still further object of the present invention is the provision of a debris lifting rake having improved means for moving and maintaining the rake member thereof into a raking position or a debris receiving and lifting position.

A still further object of the present invention is the provision of a debris lifting rake having improved means serving during the normal operation of the device to clear debris from the tines of the rake.

Still another object of the present invention is the provision of a debris lifting rake which is simple in construction, light in weight, easy to operate, and economical to manufacture.

These and other objects of the present invention will become more apparent during the course of the following detailed description and appended claims.

The invention may best be understood with reference to the accompanying drawings wherein illustrative embodiments are shown.

In the drawings:

Figure 1 is a perspective view of one form of debris lifting rake embodying the present invention showing the same in its raking position;

Figure 2 is an enlarged fragmentary perspective view of the debris lifting rake of Figure 1 showing the same in its debris receiving position;

Figure 3 is an enlarged fragmentary side elevational view of the debris lifting rake of Figure 1 showing certain parts broken away to more clearly illustrate the structure;

Figure 4 is a fragmentary perspective view of a modified form of the invention; and Figure 5 is an enlarged fragmentary side elevational view of the embodiment shown in Figure 4.

Referring now more particularly to Figures 1–3, there is shown a debris lifting rake, generally indicated at 10, which comprises an elongated handle 12 preferably constructed of round wooden stock such as is usually provided for brooms, mops and other household implements. The lower end portion of the handle 12 is preferably cut away as at 14 to provide a reduced portion upon which is rigidly mounted one end of a plate-like shovel member 16. The shovel member 16 is preferably constructed of sheet metal, with aluminum being the preferred metal due to its relative light weight. As shown in Figures 1 and 2, the plate-like shovel member 16 is segmental shaped in plan and may be provided with a plurality of longitudinally extending grooves 18. The grooves 18 are preferably formed in the shovel member by a pressing operation so that on the opposite surface of the member corresponding ridges will be provided, which serve to strengthen the shovel member. Formed in the outer end portion of the shovel member 16 adjacent the outer end of each groove 18 is a transversely extending aperture 20 provided for a purpose hereinafter to be more fully explained.

Adjacent the inner end of the cut away portion 14, a transversely extending opening or slot 22 is formed for receiving one end of a metal element 24. A pivot pin 26 extends through the reduced portion of the handle and the element 24 so as to pivotally mount the latter on the handle. The outer end of the element 24 is rigidly connected by any suitable means with the inner end of a mounting arm 26 which is substantially complementary to the cut away portion of the handle. The outer end portion of the mounting arm 26 is rigidly connected with a rake member 28 which is preferably constructed of a plurality of strips 30 of any suitable material, such as bamboo, metal or the like, connected together in outwardly diverging relation by suitable cross braces 32. The outer ends of the bamboo strips 30 are bent transversely to form a plurality of spaced tines 34 which perform the raking function of the present invention.

As can be seen from Figures 1 and 2, the rake member 28 is substantially coextensive with the shovel member 16 and by virtue of the pivotal connection at 26, the rake member may be moved toward and away from the shovel member. As shown in Figure 1, when the rake member is disposed contiguous with the shovel member, the bamboo strips 30 are disposed within the grooves 18 and the rake tines 34 extend through the apertures 20. When the rake member is moved away from the shovel member, the latter is suitable for use as a light weight snow shovel and more particularly, as a member for shoveling under debris collected by the rake. The rake member 28 serves as a convenient means for maintaining the debris on the shovel member, while the latter is being moved to a desired location.

The present invention contemplates the provision of an improved means, generally indicated at 36, for moving the rake member between its two operative positions, and for locking it in its raking position. The moving means 36 may take any form, however as shown, it preferably includes a sleeve 38, slidably mounted on the handle adjacent the cut away portion 14. The sleeve 38 is preferably formed of sheet metal and has an outwardly flared lower end 40 through which an aperture 42 is formed. A suitable lost motion connection, preferably in the form of a flexible cable element 44, has one of its ends anchored within aperture 42, and its other end connected with an eye element 46 engaged within the mounting arm 26. In order to move the sleeve 38 on the handle 12, the upper end thereof extends a substantial distance up the handle so that it may be conveniently grasped by one hand of the operator. To enable the operator to pull the sleeve upwardly without slipping the upper end is flared outwardly as at 48.

In operation, the debris lifting rake 10 of the present invention functions as follows. When it is desired to utilize the device to rake up debris, such as leaves or the like, the sleeve 38 is pushed forward by the operator until the lower end of the sleeve 38 surrounds the reduced end portion of the handle and the mounting arm 26. As shown in Figures 1 and 3, the sleeve 38 in this position will maintain the rake member 28 in continguous relation with the shovel member 16 since the mounting arm 26 is held against movement by the sleeve. As set forth above, in this position, the tines 34 extend transversely through the apertures 20 in the shovel member 16 and are suitable to function as a conventional garden rake. When it is desired to move the debris raked up by the device to another location, the sleeve 38 is pulled upwardly toward the operator, initially causing the sleeve to move away from surrounding engagement with the mounting arm 26. During this movement, the slack in the flexible element 44 is taken up so that upon further upward movement of the sleeve, the flexible element 44 will act to pivot the rake member away from the shovel member 16. It is to be noted that during this movement of the rake member, the portion of the shovel member 16 adjacent the tines 34 will act to clear any debris which has accumulated on the tines.

With the rake member thus positioned away from the shovel member 16, the operator may then shovel under the debris with the member 16 and after a load has been secured thereon, the sleeve may be moved forwardly so as to permit the rake member to move by gravity into engagement with the debris. In this manner, the rake member 28 serves to effectively maintain the debris shoveled up on the member in position during the transportation of the debris to a desired location. It will be understood that to then dispose the rake into its raking position, it is necessary merely to move the slidable sleeve 38 downwardly until the lower end is disposed in surrounding engagement with the mounting arm 26.

In Figures 4 and 5, there is shown a rake having a modified form of shovel member 16. As shown, the outer end portion of the shovel member 16 terminates just short of the tines 34 so that the outer edge 52 thereof is disposed in close proximity to the tines. By this construction, the tine clearing function of the shovel member 16 is retained and the more costly provision of the apertures 20 is eliminated. While this construction does not perform the tine clearing function with the positive action as that of the embodiment disclosed in Figures 1 and 3, nevertheless, the construction adequately clears the tines and is desirable due to its lower manufacturing cost.

It can thus be seen that there has been provided a debris lifting rake which is not appreciably heavier than an ordinary snow shovel and which functions as a unitary construction in a manner similar to a conventional garden rake. With the device of the present invention, there is provided an effective means for shoveling up and transporting without spilling the debris raked up by the rake. Furthermore, it will be understood that the shovel member 16 may be utilized alone to perform a shoveling function if necessary, that is, without the use of the rake member for holding down the debris or material shoveled up. For example, the member 16 may serve conveniently as a snow shovel for relatively light work. The construction of the rake of the present invention is relatively simple and lends itself readily to manufacture at a comparatively low cost. The device is simple in operation, and can be actuated into either of its operating positions very easily by the operator.

It is to be understood that the form of the invention herewith shown and described is to be taken as the preferred embodiment of the same and that various changes may be made without departing from the spirit of the invention or the scope of the appended claims.

I claim:

1. A debris lifting rake comprising a handle, a plate-like shovel member extending from one end of said handle, a rake member substantially coextensive with said plate member pivotally mounted with respect thereto, means for pivoting said rake member between a raking position wherein said members are contiguous and a debris receiving position wherein said members are apart, said means including a sleeve slidable on said handle and operable to lock said rake member in said raking position, said rake member having a plurality of spaced tines on its outer end, the inner ends of said tines being disposed adjacent said plate-like shovel member and extending transversely with respect thereto when said rake member is in said raking position whereby the portion of said plate-like shovel member adjacent said tines is operable when said rake member is moved into said debris receiving position to clear debris from said tines.

2. A debris lifting rake as defined in claim 1 wherein the outer end portion of said plate-like shovel member is provided with a plurality of apertures through which said tines extend when said rake member is in said raking position.

3. A debris lifting rake as defined in claim 1 wherein the outer end portion of said plate-like shovel member terminates short of said tines whereby said tines overlap said end portion when said rake member is in said raking position.

4. A debris lifting rake as defined in claim 1 wherein said sleeve extends a substantial distance up said handle so that the upper end thereof may be conveniently grasped by a hand of an operator.

5. A debris lifting rake as defined in claim 1 wherein said means includes a lost motion connection between said sleeve and said rake member.

6. A debris lifting rake comprising a handle having a reduced portion adjacent one end thereof, a plate-like shovel member rigidly secured to said reduced portion and extending outwardly therefrom, a mounting arm complementary with the reduced portion of said handle pivotally secured at its inner end thereto, a rake member substantially coextensive with said plate-like shovel member secured to said mounting arm and extending outwardly therefrom, a sleeve slidably mounted on said handle adjacent said reduced portion, a lost motion connection between said sleeve and said rake member, said sleeve being slidable to pivot said rake member between a raking position wherein said members are contiguous and a debris receiving position wherein said members are apart, said sleeve surrounding said mounting arm and the reduced portion of said handle when said rake member is in said raking position so as to hold the latter therein, said rake member including a plurality of spaced tines on the outer end thereof, said tines extending transversely of said plate-like shovel member when said rake member is in said raking position whereby the adjacent portion of said plate-like shovel member is operable to clear trash from said tines upon the initial movement of said rake member from said raking position to said debris receiving position.

7. A debris lifting rake comprising a handle, a shovel member, a substantially coextensive rake member, said members being connected with said handle for pivotal movement with respect to each other between a raking position wherein said members are contiguous and a debris receiving position wherein said members are apart, said rake member having a plurality of spaced tines extending from the outer end thereof, the outer portion of said shovel member in said raking position being disposed adjacent the inner ends of said tines, said outer shovel member portion and said tines being operable in response to the initial relative movement of said members from said raking position to said debris receiving position to move from said raking position to a tine clearing position wherein said outer shovel member portion is disposed adjacent the free ends of said tines.

8. A debris lifting rake as defined in claim 7 including means carried by said handle for effecting the relative pivotal movement between said members, said means including means for locking said members in said raking position.

References Cited in the file of this patent

UNITED STATES PATENTS

| | | |
|---|---|---|
| 1,046,177 | Graham | Dec. 3, 1912 |
| 1,160,282 | Harris et al. | Nov. 16, 1915 |
| 2,504,943 | Zifferer | Apr. 18, 1950 |